United States Patent
Kim et al.

(10) Patent No.: US 12,148,929 B2
(45) Date of Patent: Nov. 19, 2024

(54) BINDER SOLUTION HAVING LITHIUM ION CONDUCTIVITY FOR ALL-SOLID-STATE BATTERY AND ELECTRODE SLURRY COMPRISING SAME

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Sang Mo Kim, Hwaseong-si (KR); Jae Min Lim, Suwon-si (KR); Sang Heon Lee, Yongin-si (KR); Tae Young Kwon, Daegu (KR); Hoon Seok, Suwon-si (KR); Yoon Seok Jung, Seoul (KR); Kyu Tae Kim, Bucheon-si (KR); Dae Yang Oh, Hwaseong-si (KR)

(73) Assignees: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 143 days.

(21) Appl. No.: 17/092,927

(22) Filed: Nov. 9, 2020

(65) Prior Publication Data
US 2021/0202949 A1 Jul. 1, 2021

(30) Foreign Application Priority Data
Dec. 26, 2019 (KR) .................. 10-2019-0174626

(51) Int. Cl.
*H01M 4/62* (2006.01)
*H01M 10/0562* (2010.01)

(52) U.S. Cl.
CPC ....... *H01M 4/622* (2013.01); *H01M 10/0562* (2013.01)

(58) Field of Classification Search
CPC ............ H01M 4/02; H01M 4/62; H01M 4/13; H01M 4/131; H01M 4/621; H01M 4/622; H01M 4/623; H01M 4/634; H01M 10/056; H01M 10/0562; H01M 10/052; H01M 10/0525; H01M 2300/0065; H01M 2300/0068; Y02E 60/10
See application file for complete search history.

(56) References Cited

U.S. PATENT DOCUMENTS

| | | | |
|---|---|---|---|
| 2003/0073000 A1* | 4/2003 | Lee | H01M 4/5815 429/231.95 |
| 2013/0157143 A1* | 6/2013 | Hoshiba | H01M 4/621 429/211 |
| 2014/0162141 A1* | 6/2014 | Fujiki | H01M 10/0562 429/304 |
| 2015/0236343 A1* | 8/2015 | Xiao | H01M 4/13 429/217 |
| 2018/0241077 A1* | 8/2018 | Takahashi | H01M 4/13 |
| 2019/0326589 A1* | 10/2019 | Ho | H01M 4/1393 |

FOREIGN PATENT DOCUMENTS

| | | | | |
|---|---|---|---|---|
| CN | 107039655 A | | 8/2017 | |
| JP | 2010-146823 A | | 7/2010 | |
| JP | 2013-033659 A | | 2/2013 | |
| KR | 2008-0047904 A | | 5/2008 | |
| KR | 2013-0056204 A | | 5/2013 | |
| KR | 20180036410 A | * | 4/2018 | ........ H01M 10/0562 |
| KR | 2018-0116148 A | | 10/2018 | |
| KR | 2018-0138134 A | | 12/2018 | |
| KR | 2019-0000324 A | | 1/2019 | |

OTHER PUBLICATIONS

Yu et al. "Fabrication and Characterization of PEO/PPC Polymer Electrolyte for Lithium-Ion Battery", Journal of Applied Polymer Science, vol. 115, 2718-2722 (2010) (Year: 2010).*
B. Scrosati (ed.), Applications of Electroactive Polymers (Chapman & Hall 1993). Abraham, Chapter 3 entitled "Highly Conductive Polymer Electrolytes" (Year: 1993).*
Pohanish, Richard P.. (2008). Sittig's Handbook of Toxic and Hazardous Chemicals and Carcinogens (5th Edition). William Andrew Publishing. (Year: 2008).*
Young et al. (KR20180036410 (A) and using machine translation as English version) (Year: 2018).*

* cited by examiner

*Primary Examiner* — Milton I Cano
*Assistant Examiner* — Joshua P McClure
(74) *Attorney, Agent, or Firm* — MCDONNELL BOEHNEN HULBERT & BERGHOFF LLP

(57) ABSTRACT

The present disclosure relates to a binder solution having lithium ion conductivity for an all-solid-state battery and an electrode slurry including the same. Specifically, the binder solution includes a first binder having high binding force, a second binder having higher lithium ion conductivity than that of the first binder, a lithium salt, and an organic solvent that dissolves the lithium salt.

8 Claims, 12 Drawing Sheets

BINDER SOLUTION HAVING LITHIUM ION CONDUCTIVITY FOR ALL-SOLID-STATE BATTERY AND ELECTRODE SLURRY COMPRISING SAME

CROSS REFERENCE TO RELATED APPLICATIONS

The present application claims priority based on Korean Patent Application No. 10-2019-0174626, filed on Dec. 26, 2019, the entire content of which is incorporated herein for all purposes by this reference.

BACKGROUND

1. Technical Field

The present disclosure relates to a binder solution having lithium ion conductivity for an all-solid-state battery and an electrode slurry including the same.

2. Description of the Related Art

Rechargeable batteries are used not only for small electronic devices such as mobile phones, laptop computers and the like but also for large vehicles such as hybrid vehicles, electric vehicles and the like. Accordingly, the development of secondary batteries having higher stability and energy density is required.

Most conventional secondary batteries are limited in the extent to which stability and energy density can be improved because cells are configured using organic solvents (organic liquid electrolytes).

Meanwhile, all-solid-state batteries using inorganic solid electrolytes have received a great deal of attention recently because cells may be manufactured in a safer and simpler manner based on technology that excludes organic solvents.

Electrodes for all-solid-state batteries include electrode active materials and solid electrolytes. Briefly, the components thereof are all in a solid state. In the all-solid-state battery using a solid electrolyte, therefore, a lithium ion transport path is formed when the particles contact each other. Moreover, electrodes for all-solid-state batteries are mainly formed through a wet process. To this end, a binder has to be essentially added. In particular, in order to apply a sulfide solid electrolyte having high lithium ion conductivity, a non-polar polymer binder has to be used to suppress a chemical reaction. However, such a polymer binder has low lithium ion conductivity, limiting the capacity, lifetime and output characteristics of the battery.

SUMMARY

Accordingly, an objective of the present disclosure is to provide a binder solution for an all-solid-state battery, which is capable of providing binding force between electrode components and forming an efficient lithium ion transport path in the electrodes.

Another objective of the present disclosure is to provide a binder solution suitable for manufacturing an all-solid-state battery having a large area.

Still another objective of the present disclosure is to provide a binder solution suitable for manufacturing an all-solid-state battery that may operate even in a high-temperature environment.

The objectives of the present disclosure are not limited to the foregoing, and will be able to be clearly understood through the following description and to be realized by the means described in the claims and combinations thereof.

An embodiment of the present disclosure provides a binder solution for an all-solid-state battery, including a first binder, a second binder having higher lithium ion conductivity than that of the first binder, a lithium salt, and an organic solvent that dissolves the lithium salt.

The first binder may be selected from the group consisting of nitrile-butadiene rubber (NBR), butadiene rubber (BR), styrene-butadiene rubber (SBR) and combinations thereof.

The first binder may have a lithium ion conductivity ($\sigma_1$) of $10^{-6}$ S/cm to $10^{-7}$ S/cm.

The second binder may be selected from the group consisting of poly(propylene carbonate) (PPC), poly(vinyl acetate) (PVA), poly(1,4-butylene adipate) (PBA) and combinations thereof.

The second binder may be at least partially miscible with the first binder.

The lithium ion conductivity ratio ($\sigma_2/\sigma_1$) of the second binder and the first binder may be 100 to 4,000.

The lithium salt may be selected from the group consisting of lithium hexafluorophosphate (LiPF$_6$), lithium bis(fluorosulfonyl)imide (LiFSI), lithium bis(trifluoromethanesulfonyl)imide (LiTFSI), lithium bis(pentafluoroethanesulfonyl)imide (LiBETI) and combinations thereof.

The organic solvent may be selected from the group consisting of benzyl acetate, ethyl 4-methylbenzoate, anisole, ethyl p-anisate, benzyl isobutyrate and combinations thereof.

The organic solvent may have a boiling point of 150° C. to 300° C.

The organic solvent may have a vapor pressure of 0.001 mmHg to 10 mmHg at room temperature.

The binder solution may include 10 wt % or less but exceeding 0 wt % of the first binder and the second binder, 10 wt % or less but exceeding 0 wt % of the lithium salt, and the remainder of the organic solvent.

The weight ratio ($m_2/m_1$) of the second binder and the first binder may be 3 or less but exceeding 0.

Another embodiment of the present disclosure provides an electrode slurry for an all-solid-state battery, including the above binder solution, an electrode active material, a conductive material, and a solid electrolyte.

The electrode slurry may include 30 wt % or less but exceeding 0 wt % of the binder solution, 10 wt % or less but exceeding 0 wt % of the conductive material, 20 wt % or less but exceeding 0 wt % of the solid electrolyte, and the remainder of the electrode active material.

According to the present disclosure, the binder solution is capable of providing binding force between electrode components and more efficiently forming a lithium ion transport path in the electrodes because it has itself lithium ion conductivity. Therefore, an all-solid-state battery having significantly improved charge-discharge capacity and a prolonged lifetime can be obtained.

According to the present disclosure, the binder solution uses a solvent having low volatility, thereby ensuring the stability of slurry, and thus an all-solid-state battery having a large area can be manufactured.

The use of the binder solution according to the present disclosure makes it possible to manufacture an all-solid-state battery that does not degrade upon high-temperature evaluation or high-temperature operation.

The effects of the present disclosure are not limited to the foregoing, and should be understood to include all effects that can be reasonably anticipated from the following description.

DETAILED DESCRIPTION

Figure 1:
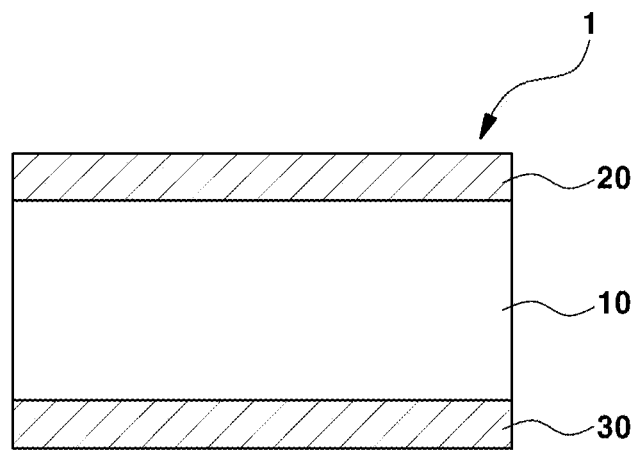
FIG. 1 is a schematic cross-sectional view showing an all-solid-state battery according to an embodiment of the present disclosure.

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a schematic cross-sectional view showing an all-solid-state battery according to an embodiment of the present disclosure. The all-solid-state battery 1 includes a solid electrolyte layer 10, a cathode 20 formed on one surface of the solid electrolyte layer 10, and an anode 30 formed on the other surface of the solid electrolyte layer 10. Hereinafter, the term "electrode" refers to the cathode 20 or the anode 30 generically.

At least one of the solid electrolyte layer 10, the cathode 20 and the anode 30 includes a binder. The binder is derived from a binder solution. Hereinafter, the binder solution according to the present disclosure is described in detail.

Binder Solution

The binder solution according to the present disclosure may include a first binder, a second binder having higher lithium ion conductivity than that of the first binder, a lithium salt, and an organic solvent that dissolves the lithium salt.

The first binder is responsible for providing binding force between components constituting the solid electrolyte layer and the electrode.

The first binder may be selected from the group consisting of nitrile-butadiene rubber (NBR), butadiene rubber (BR), styrene-butadiene rubber (SBR) and combinations thereof.

The first binder, which provides binding force, has low lithium ion conductivity and thus may interfere with the transport of lithium ions in the solid electrolyte layer and the electrode. Specifically, the lithium ion conductivity ($\sigma_1$) of the first binder may fall in the range of $10^{-6}$ S/cm to $10^{-7}$ S/cm.

Accordingly, the present disclosure is characterized in that it solves the above problems by adding the second binder and the lithium salt.

The second binder is responsible for improving lithium ion conductivity in the solid electrolyte layer and the electrode.

The second binder is miscible with the first binder, the lithium salt and the organic solvent. In particular, it may be at least partially miscible with the first binder. As used herein, the term "miscible" means that two materials are stably mixed so that the product resulting from mixing the two materials has desired properties. Here, the two materials may be physically and/or chemically interconnected.

The second binder may be selected from the group consisting of poly(propylene carbonate) (PPC), poly(vinyl acetate) (PVA), poly(1,4-butylene adipate) (PBA) and combinations thereof.

Since the second binder has high lithium ion conductivity, a binder solution including the same may itself have lithium ion conductivity. Specifically, the lithium ion conductivity ratio ($\sigma_2/\sigma_1$) of the second binder and the first binder may be 100 to 4,000. For example, poly(propylene carbonate) (PPC), usable as the second binder, has a maximum lithium ion conductivity of about $4 \times 10^{-6}$ S/cm, and poly(vinyl acetate) (PVA) and poly(1,4-butylene adipate) (PBA) have a maximum lithium ion conductivity of about $10^{-5}$ S/cm.

Moreover, the present disclosure is characterized by further improving the lithium ion conductivity by adding the lithium salt together with the second binder. The lithium salt may be miscible with the organic solvent, the first binder and the second binder, and is available. As used herein, the term "available" means that when two materials are used together, there are no side reactions, and the individual properties thereof are expressed as they are.

The lithium salt may be selected from the group consisting of lithium hexafluorophosphate ($LiPF_6$), lithium bis(fluorosulfonyl)imide (LiFSI), lithium bis(trifluoromethanesulfonyl)imide (LiTFSI), lithium bis(pentafluoroethanesulfonyl)imide (LiBETI) and combinations thereof.

The organic solvent may dissolve the first binder, the second binder and the lithium salt.

The organic solvent may have a boiling point of 150° C. to 300° C. During the manufacture of the all-solid-state battery, the drying temperature is typically 60° C. to 120° C. The organic solvent does not disappear due to evaporation during the above drying process.

Also, the organic solvent may have a vapor pressure of 0.001 mmHg to 10 mmHg at room temperature. That is, the volatility of the organic solvent may be low. Accordingly, it does not evaporate during the manufacture of the all-solid-state battery.

Consequently, the use of the organic solvent as described above may greatly increase the stability of the binder solution and the electrode slurry including the same, making it advantageous in the manufacture of an all-solid-state battery having a large area.

The organic solvent is not particularly limited, so long as it satisfies the above requirements, and may be selected from the group consisting of benzyl acetate, ethyl 4-methylbenzoate, anisole, ethyl p-anisate, benzyl isobutyrate and combinations thereof.

The binder solution may include 10 wt % or less, but exceeding 0 wt %, of the first binder and the second binder. When the sum of the amount of the first binder and the amount of the second binder falls in the above range, the binding force and lithium ion conductivity of the binder solution may be obtained at desired levels in a balanced manner.

Here, the weight ratio ($m_2/m_1$) of the second binder and the first binder may be 3 or less but exceeding 0. If the weight ratio thereof is greater than 3, the amount of the second binder is excessive, and thus the binding force of the binder solution may be insufficient.

The binder solution may include the lithium salt in an amount of 10 wt % or less but exceeding 0 wt %, and preferably 3 wt % or less but exceeding 0 wt %. Also, the amount of the lithium salt may be appropriately adjusted depending on the type of the second binder.

Electrode for all-Solid-State Battery

The electrode for an all-solid-state battery according to the present disclosure may be manufactured through a wet process. Specifically, the electrode may be manufactured in a manner in which an electrode slurry including the binder solution, an electrode active material, a conductive material and a solid electrolyte is prepared, applied on a substrate and then dried.

The electrode slurry may include 30 wt % or less but exceeding 0 wt % of the binder solution, 10 wt % or less but exceeding 0 wt % of the conductive material, 20 wt % or less but exceeding 0 wt % of the solid electrolyte, and the remainder of the electrode active material.

Since the binder solution has been described above, a detailed description thereof is omitted.

The electrode active material may be a cathode active material or an anode active material.

The cathode active material is not particularly limited, but may be, for example, an oxide active material or a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ and the like, a spinel-type active material such as $LiMn_2O_4$, $Li(Ni_{0.5}Mn_{1.5})O_4$ and the like, an inverse-spinel-type active material such as $LiNiVO_4$, $LiCoVO_4$ and the like, an olivine-type active material such as $LiFePO_4$, $LiMnPO_4$, $LiCoPO_4$, $LiNiPO_4$ and the like, a silicon-containing active material such as $Li_2FeSiO_4$, $Li_2MnSiO_4$ and the like, a rock-salt-layer-type active material in which a portion of a transition metal is substituted with a different metal, such as $LiNi_{0.8}Co_{(0.2-x)}Al_xO_2$ ($0<x<0.2$), a spinel-type active material in which a portion of a transition metal is substituted with a different metal, such as $Li_{1+x}Mn_{2-x-y}M_yO_4$ (M being at least one of Al, Mg, Co, Fe, Ni and Zn, $0<x+y<2$), or lithium titanate such as $Li_4Ti_5O_{12}$ and the like.

The sulfide active material may be copper chevrel, iron sulfide, cobalt sulfide, nickel sulfide, etc.

The anode active material is not particularly limited, but may be, for example, a carbon active material or a metal active material.

The carbon active material may be graphite such as mesocarbon microbeads (MCMB), highly oriented pyrolytic graphite (HOPG), etc., or amorphous carbon such as hard carbon and soft carbon.

The metal active material may be In, Al, Si, Sn or an alloy containing at least one element thereof.

The conductive material functions to form an electron-conducting path in the electrode. The conductive material may be sp² carbon material such as carbon black, conductive graphite, ethylene black, carbon nanotubes, etc., or graphene.

The solid electrolyte may be an oxide solid electrolyte or a sulfide solid electrolyte. Here, the use of a sulfide solid electrolyte having high lithium ionic conductivity is preferable.

The sulfide solid electrolyte may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$-LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$-$\alpha_2S_3$, $Li_2S$—$P_2S_5$—$Z_mS_n$ (in which m and n are positive numbers, and Z is any one of Ge, Zn and Ga), $Li_2S$—$GeS_2$, $Li_2S$—$SiS_2$—$Li_3PO_4$, $Li_2S$—$SiS_2$—$Li_xMO_y$ (in which x and y are positive numbers, and M is any one of P, Si, Ge, B, Al, Ga and In), $Li_{10}GeP_2S_{12}$, etc.

Solid Electrolyte Layer for all-Solid-State Battery

The solid electrolyte layer 10 is positioned between the cathode 20 and the anode 30 to allow lithium ions to move between two electrodes.

The solid electrolyte layer 10 may be manufactured through a wet process. Specifically, the solid electrolyte layer may be manufactured in a manner in which a solid electrolyte layer slurry, including the binder solution and the solid electrolyte, is prepared, applied on a substrate or on the electrode, and dried.

Since the binder solution has been described above, a detailed description thereof is omitted.

The solid electrolyte layer 10 may include a solid electrolyte that is the same as or different from the solid electrolyte included in the electrode described above. Here, it is preferred to include a sulfide solid electrolyte having high lithium ion conductivity.

A better understanding of the present disclosure will be given through the following examples, which are merely set forth to illustrate the present disclosure but are not to be construed as limiting the scope of the present disclosure.

EXAMPLES AND COMPARATIVE EXAMPLE

A binder solution was obtained by dissolving a first binder and a second binder, shown in Table 1 below, and lithium bis(fluorosulfonyl)imide (LiFSI), as a lithium salt, in an organic solvent.

An electrode slurry was prepared by mixing 26.1 wt % of the binder solution, 54.4 wt % of an electrode active material, 0.8 wt % of a conductive material and 18.7 wt % of a solid electrolyte. As the electrode active material, a rock-salt-layer-type cathode active material $Li_{1+x}Ni_{1/3}Co_{1/3}Mn_{1/3}O_2$ was used, the conductive material was carbon black, and the solid electrolyte was $Li_2S$—$P_2S_5$—LiCl.

The electrode slurry was applied on the solid electrolyte layer and dried at about 60° C. for 2 hr, thus forming a cathode.

A lithium indium foil (Li—In foil), serving as an anode, was attached to the stack of the cathode and the solid electrolyte layer, thereby completing an all-solid-state battery.

For reference, the present examples are intended to prove whether the aforementioned effect is obtained when the cathode is manufactured using the ion conductive additive. The aforementioned effect is not obtained only when lithium metal is used as the anode, and even when an all-solid-state battery is completed using the anode manufactured in a manner the same as or similar to the cathode, the same effect may be obtained, as will be apparent to those skilled in the art.

TABLE 1

| No. | First binder | Second binder | Amount of lithium salt [wt %] | Evaluation temperature |
|---|---|---|---|---|
| Comparative Example 1 | NBR | — | 0 | Room temperature (25° C.) |
| Example 1-1 | NBR | PPC | 0 | |
| Example 1-2 | | | 0.5 | |
| Example 1-3 | | | 1 | |
| Example 1-4 | | | 3 | |
| Example 2-1 | NBR | PVA | 0 | |
| Example 2-2 | | | 0.5 | |
| Example 2-3 | | | 1 | |
| Example 2-4 | | | 3 | |
| Example 3-1 | NBR | PBA | 0 | |
| Example 3-2 | | | 0.5 | |
| Example 3-3 | | | 1 | |
| Example 3-4 | | | 3 | |
| Example 4 | NBR | PBA | 0 | 70° C. |
| Example 5 | NBR | PBA | 3 | |

Test Example 1

Figure 2A:
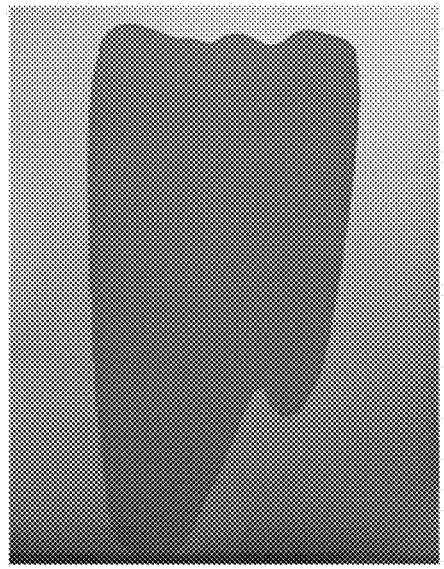
FIG. 2A is a photograph showing a cathode manufactured using an electrode slurry including the binder solution of Example 1-4 according to the present disclosure.
Figure 2B:
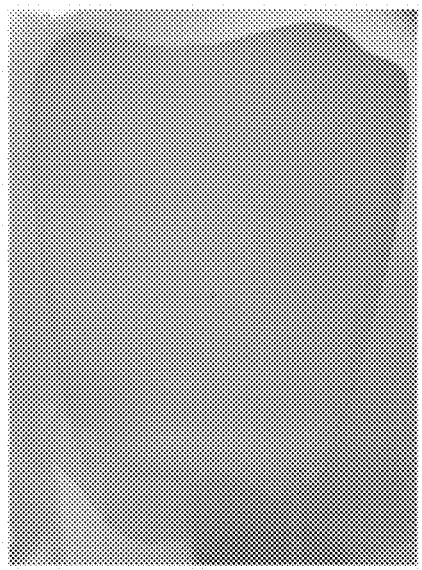
FIG. 2B is a photograph showing a cathode manufactured using an electrode slurry including the binder solution of Example 2-4 according to the present disclosure.
Figure 2C:
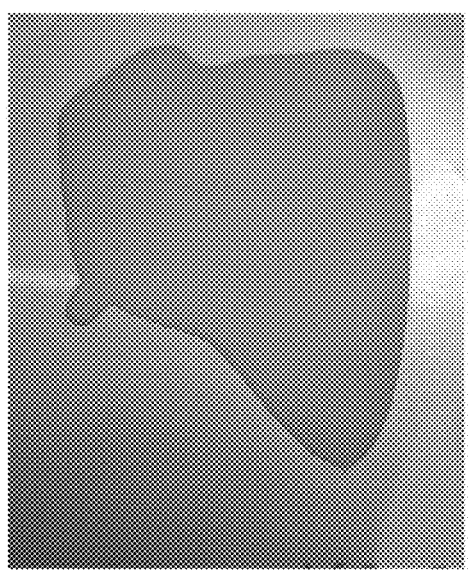
FIG. 2C is a photograph showing a cathode manufactured using an electrode slurry including the binder solution of Example 3-4 according to the present disclosure.

FIG. 2A is a photograph showing a cathode manufactured using an electrode slurry including the binder solution of Example 1-4, FIG. 2B is a photograph showing a cathode manufactured using an electrode slurry including the binder solution of Example 2-4, and FIG. 2C is a photograph showing a cathode manufactured using an electrode slurry including the binder solution of Example 3-4.

Figure 3A:
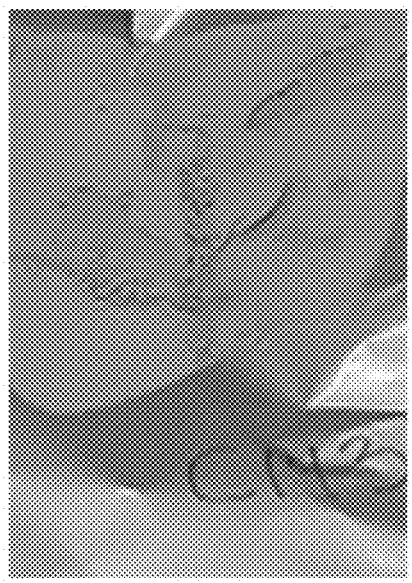
FIG. 3A is a photograph showing a cathode manufactured using an electrode slurry including only a second binder, polypropylene carbonate) (PPC), without including a first binder.
Figure 3B:
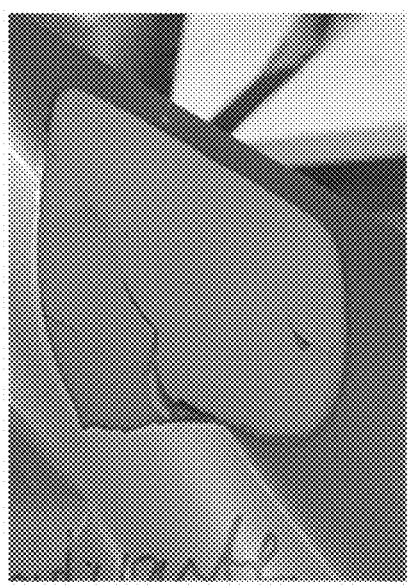
FIG. 3B is a photograph showing a cathode manufactured using an electrode slurry including only a second binder, poly(vinyl acetate) (PVA), without including a first binder.
Figure 3C:
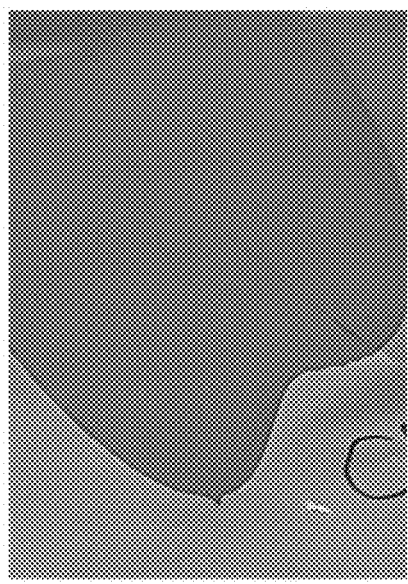
FIG. 3C is a photograph showing a cathode manufactured using an electrode slurry including only a second binder, poly(1,4-butylene adipate) (PBA), without including a first binder.

FIG. 3A is a photograph showing a cathode manufactured using an electrode slurry including only a second binder, poly(propylene carbonate) (PPC), without including a first binder. FIG. 3B is a photograph showing a cathode manufactured using an electrode slurry including only a second binder, poly(vinyl acetate) (PVA), without including a first binder. FIG. 3C is a photograph showing a cathode manufactured using an electrode slurry including only a second binder, poly(1,4-butylene adipate) (PBA), without including a first binder.

When comparing FIG. 2A with FIG. 3A, FIG. 2B with FIG. 3B, and FIG. 2C with FIG. 3C, the use of the binder solution including only the second binder resulted in poor electrode adhesion. It can be confirmed that when using both the first binder and the second binder, the electrode was uniformly formed because of the high electrode adhesion.

Test Example 2

Figure 4A:
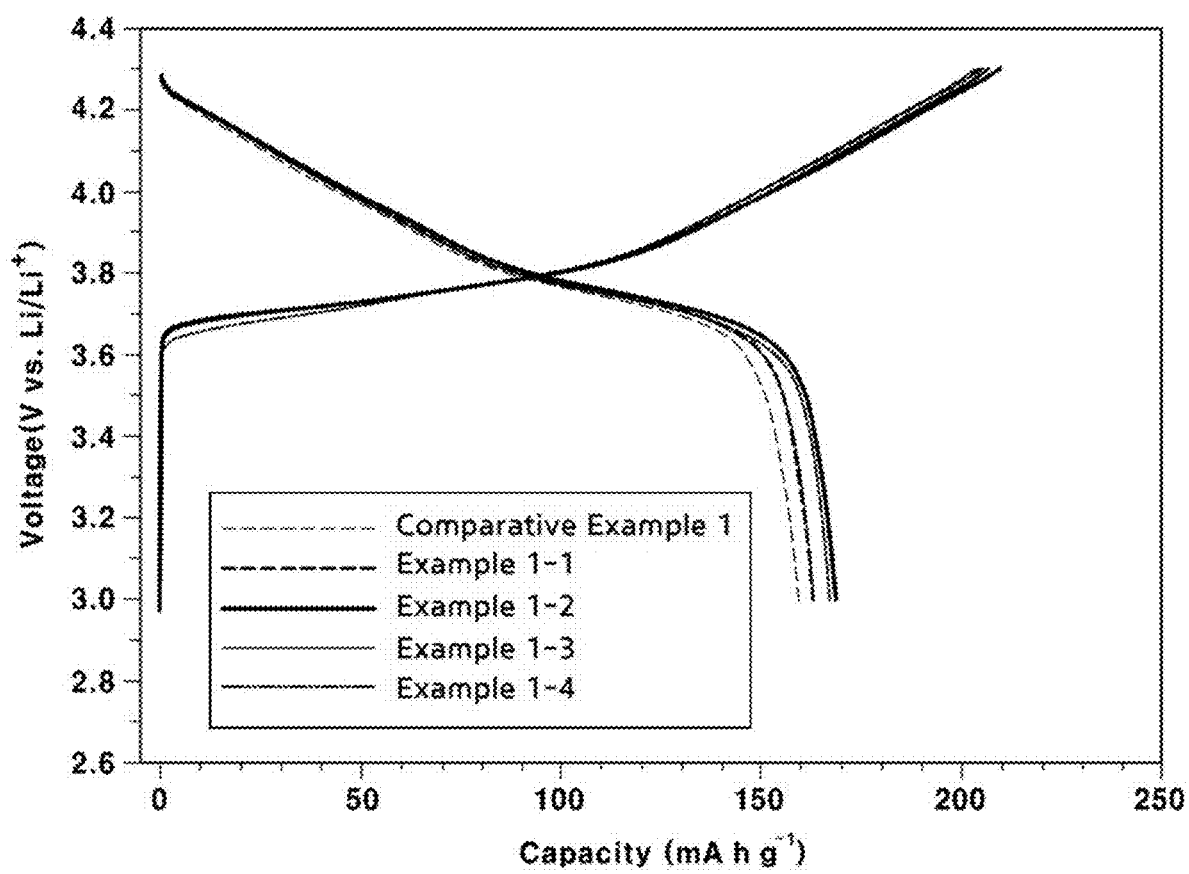
FIGS. 4A and 4B show the results of measurement of charge-discharge capacity and rate characteristics when the all-solid-state batteries manufactured using the binder solutions of Comparative Example 1 and Examples 1-1 to 1-4 are charged and discharged at room temperature in Test Example 2 according to the present disclosure.
Figure 4B:
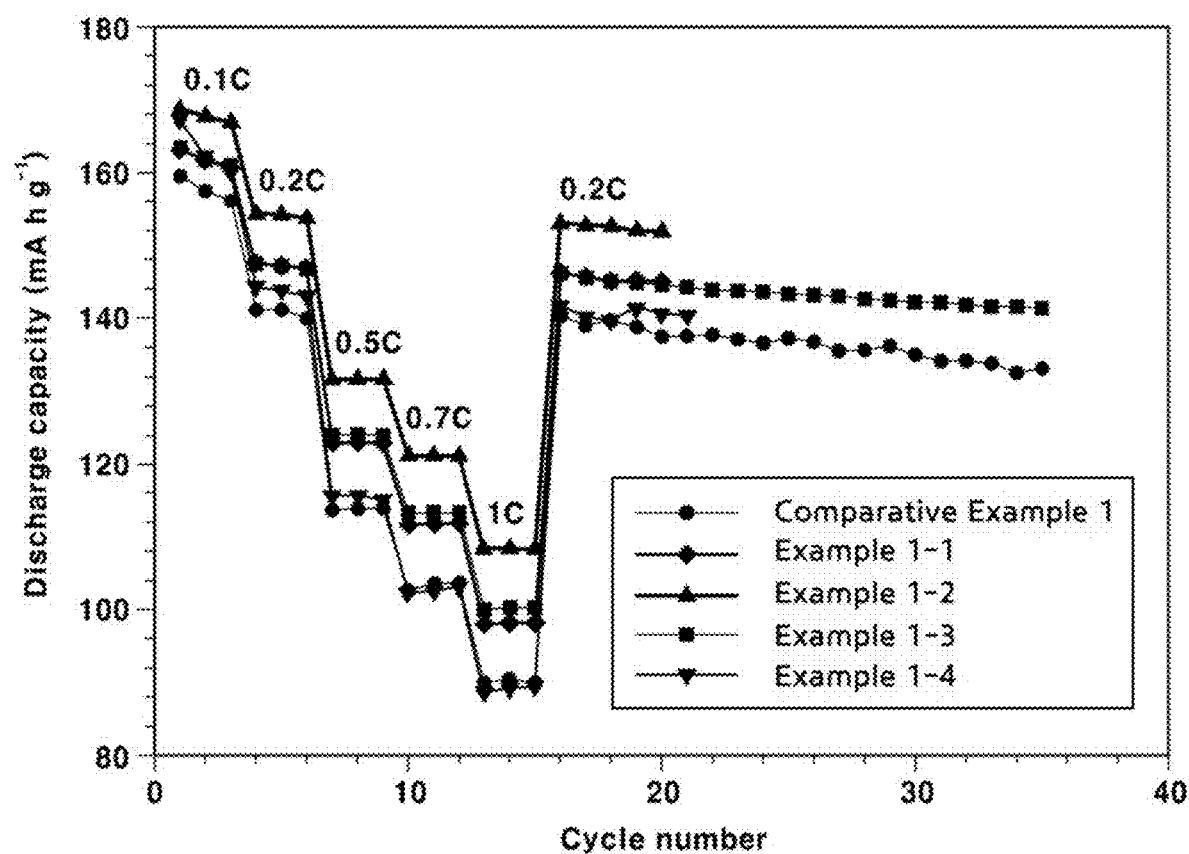

When the all-solid-state batteries manufactured using the binder solutions of Comparative Example 1 and Examples 1-1 to 1-4 were charged and discharged at room temperature, charge-discharge capacity and rate characteristics were measured. The results thereof are shown in FIGS. 4A and 4B.

Figure 5A:
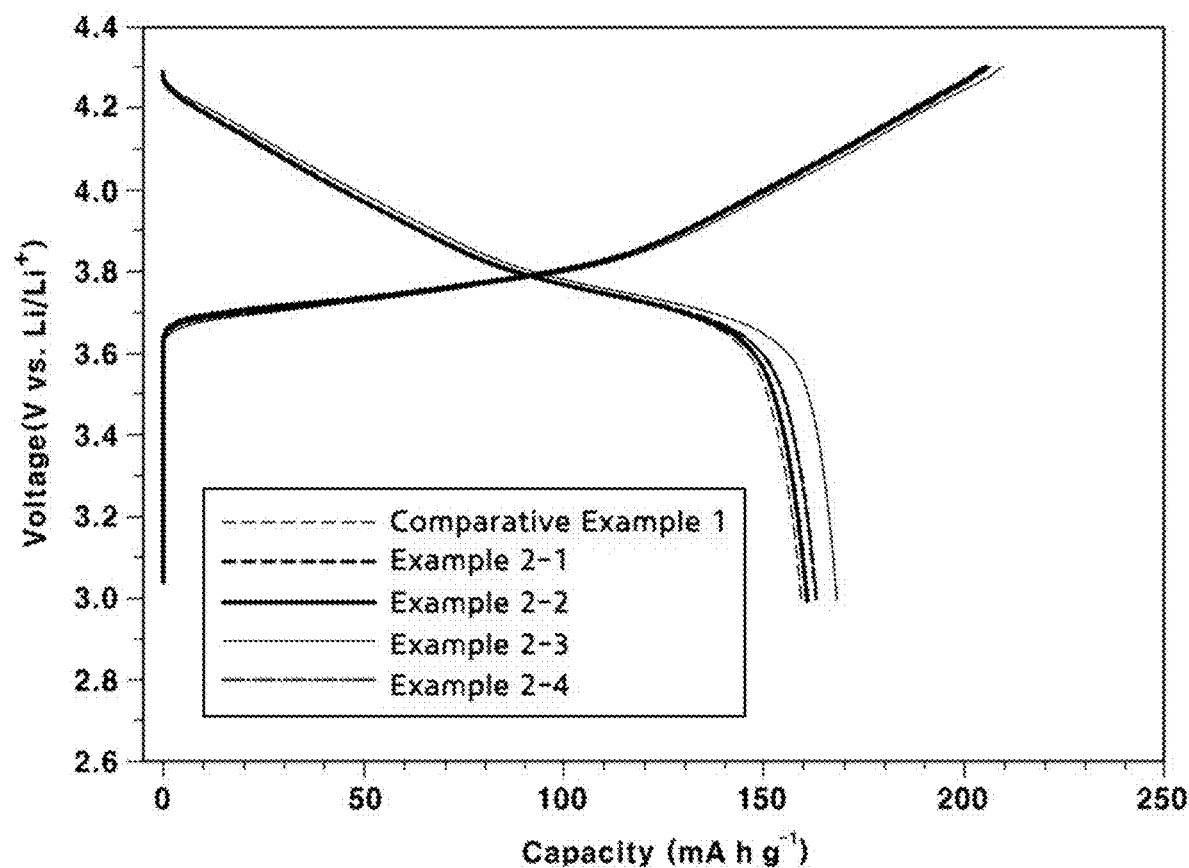
FIGS. 5A and 5B show the results of measurement of charge-discharge capacity and rate characteristics when the all-solid-state batteries manufactured using the binder solutions of Comparative Example 1 and Examples 2-1 to 2-4 are charged and discharged at room temperature in Test Example 2 according to the present disclosure.
Figure 5B:
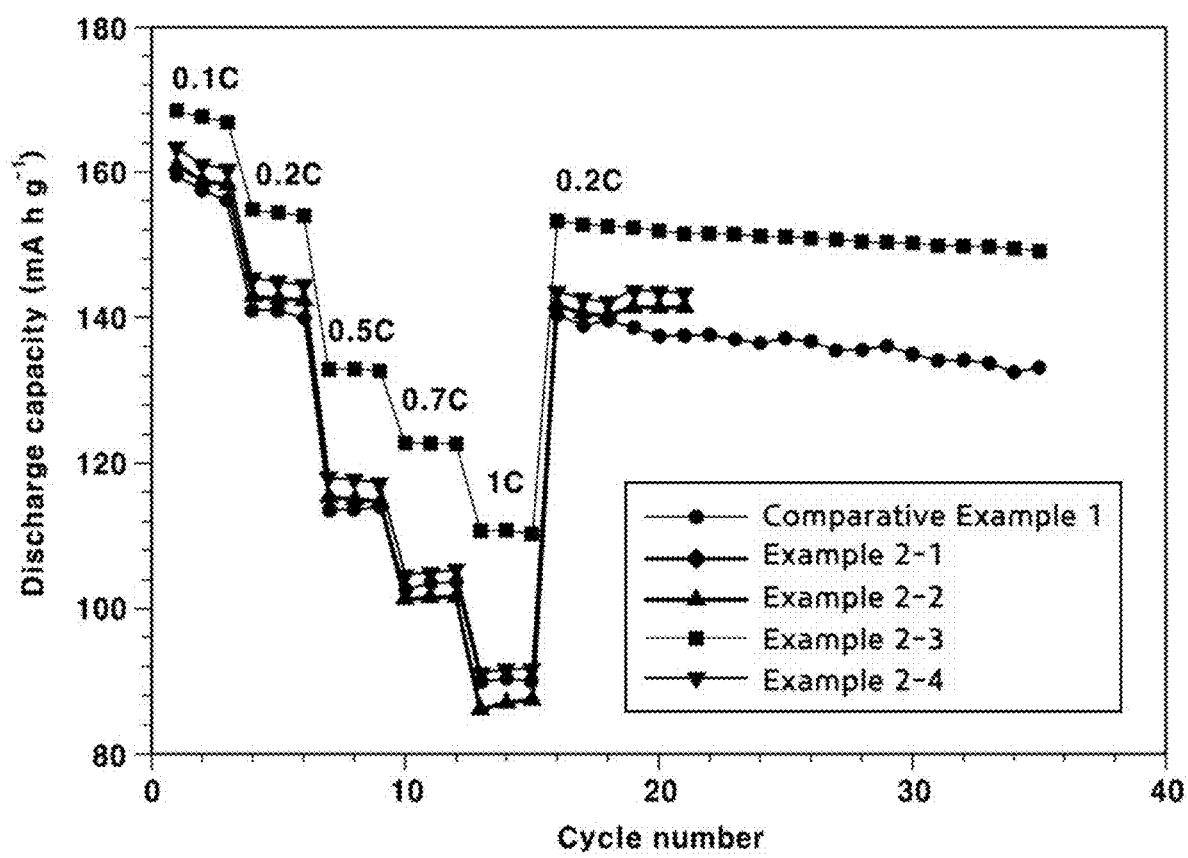

When the all-solid-state batteries manufactured using the binder solutions of Comparative Example 1 and Examples 2-1 to 2-4 were charged and discharged at room temperature, charge-discharge capacity and rate characteristics were measured. The results thereof are shown in FIGS. 5A and 5B.

Figure 6A:
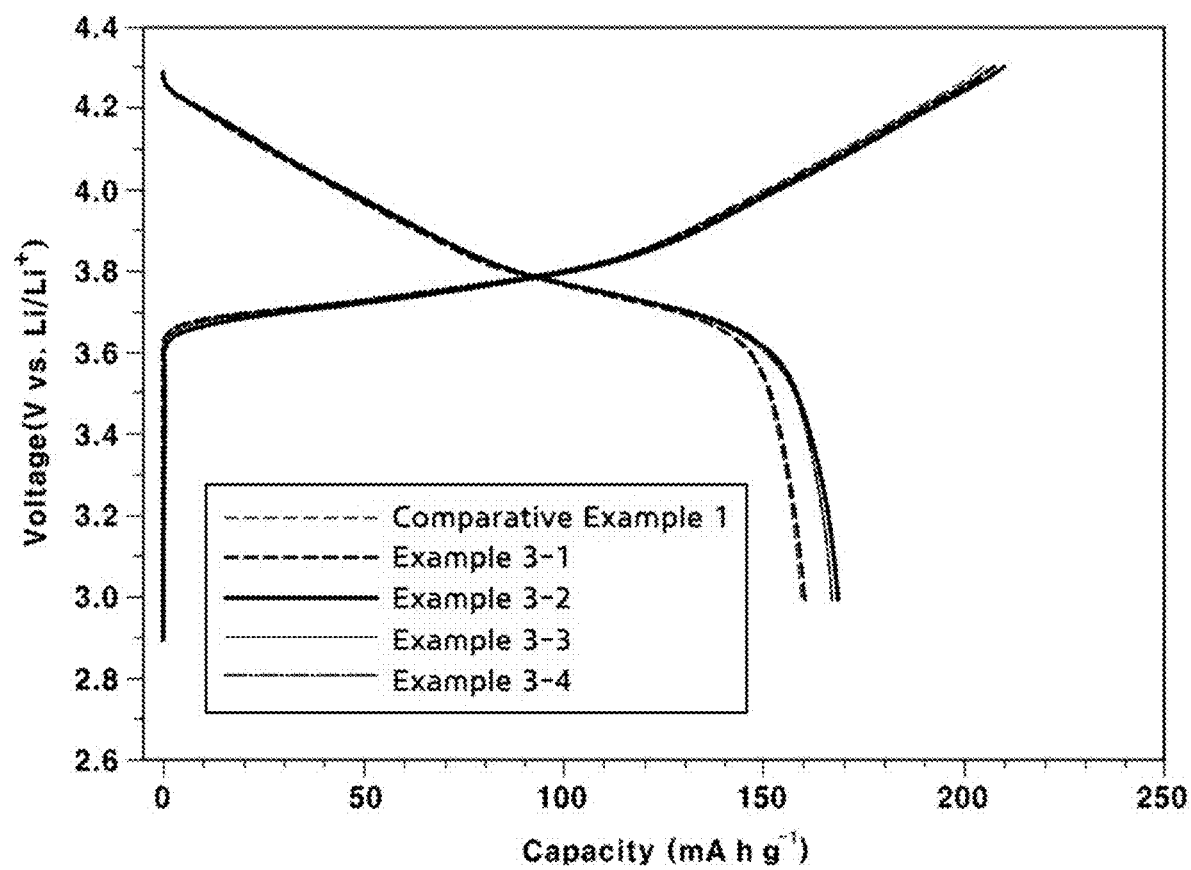
FIGS. 6A and 6B show the results of measurement of charge-discharge capacity and rate characteristics when the all-solid-state batteries manufactured using the binder solutions of Comparative Example 1 and Examples 3-1 to 3-4 are charged and discharged at room temperature in Test Example 2 according to the present disclosure.
Figure 6B:
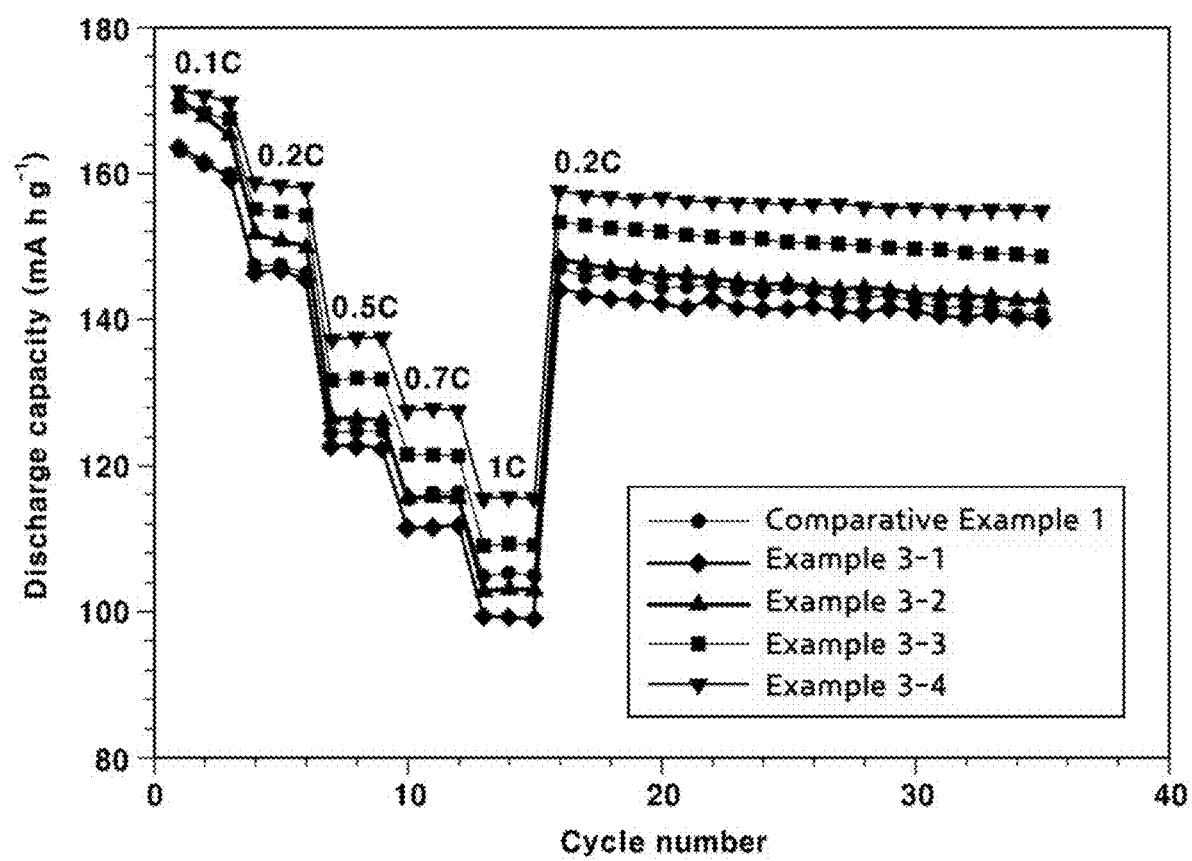

When the all-solid-state batteries manufactured using the binder solutions of Comparative Example 1 and Examples 3-1 to 3-4 were charged and discharged at room temperature, charge-discharge capacity and rate characteristics were measured. The results thereof are shown in FIGS. 6A and 6B.

The results of measurement of initial coulombic efficiency of the all-solid-state batteries manufactured using the binder solutions of Examples and Comparative Example are shown in Table 2 below.

TABLE 2

| No. | Initial coulombic efficiency [%] |
| --- | --- |
| Comparative Example 1 | 78.1 |
| Example 1-1 | 79.2 |
| Example 1-2 | 78.4 |
| Example 1-3 | 80.3 |
| Example 1-4 | 79.2 |
| Example 2-1 | 78.9 |
| Example 2-2 | 80.5 |
| Example 2-3 | 80.2 |
| Example 2-4 | 81.5 |
| Example 3-1 | 77.2 |
| Example 3-2 | 80.4 |
| Example 3-3 | 80.9 |
| Example 3-4 | 81.9 |
| Example 4 | 84.2 |
| Example 5 | 91.8 |

As is apparent from FIGS. 4A and 4B and Table 2, the all-solid-state batteries of Examples 1-1 to 1-4 exhibited high initial coulombic efficiency and improved discharge capacity and rate characteristics compared to Comparative Example 1. This is because the binder solution according to the present disclosure includes the second binder, having high lithium ion conductivity, and thus exhibits lithium ion conductivity.

As is apparent from FIGS. 5A and 5B and Table 2, the all-solid-state batteries of Examples 2-1 to 2-4 exhibited high initial coulombic efficiency and improved discharge capacity and rate characteristics compared to Comparative Example 1. The rate characteristics were slightly decreased from 0.7c and 1.0c in Example 2-2 compared to Comparative Example 1, but all other indicators were improved, which is also superior to Comparative Example 1.

As is apparent from FIGS. 6A and 6B and Table 2, the all-solid-state batteries of Examples 3-1 to 3-4 exhibited initial coulombic efficiency, discharge capacity and rate characteristics equivalent or superior to Comparative Example 1. The rate characteristics were decreased slightly in Example 3-1 compared to Comparative Example 1 but can be sufficiently compensated for by adding the lithium salt.

Test Example 3

Figure 7A:
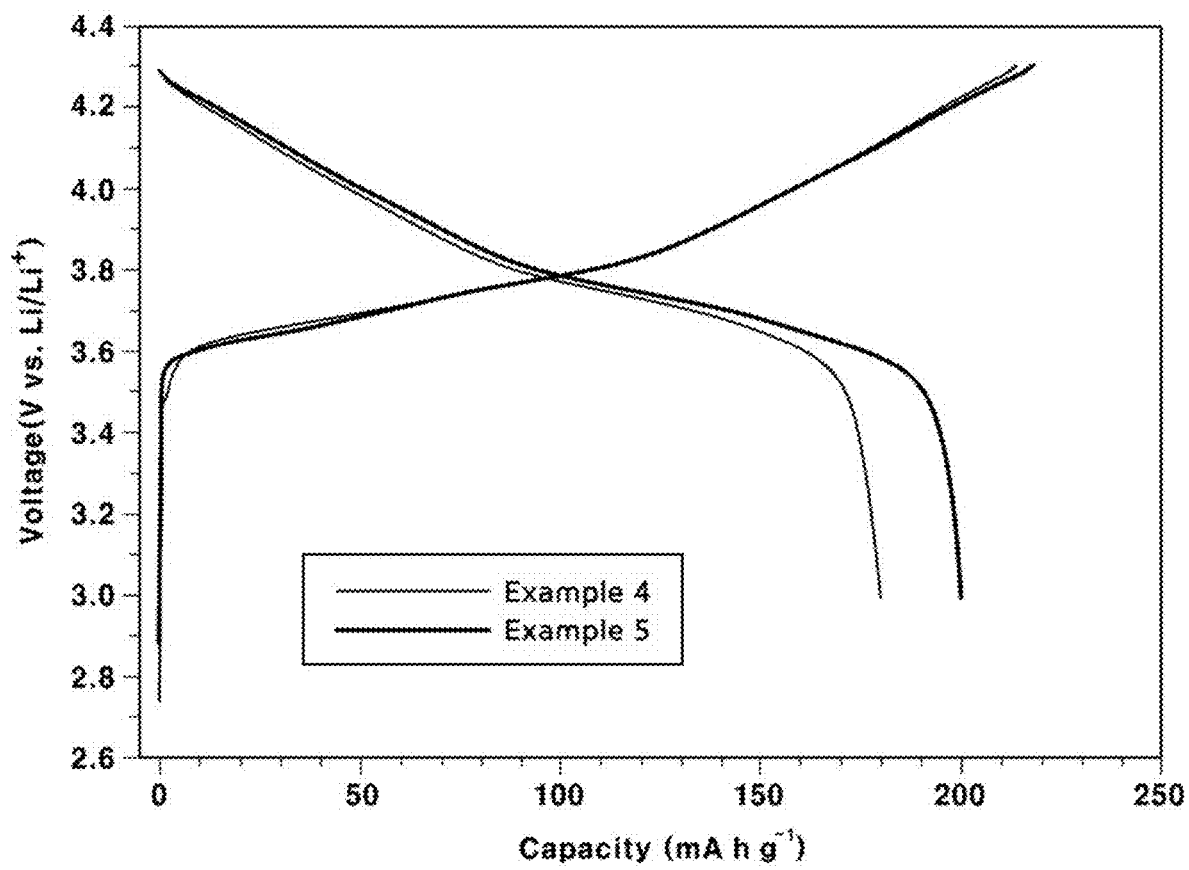
FIGS. 7A and 7B show the results of measurement of charge-discharge capacity and rate characteristics when the all-solid-state batteries manufactured using the binder solutions of Examples 4 and 5 are charged and discharged at about 70° C. in Test Example 3 according to the present disclosure.
Figure 7B:
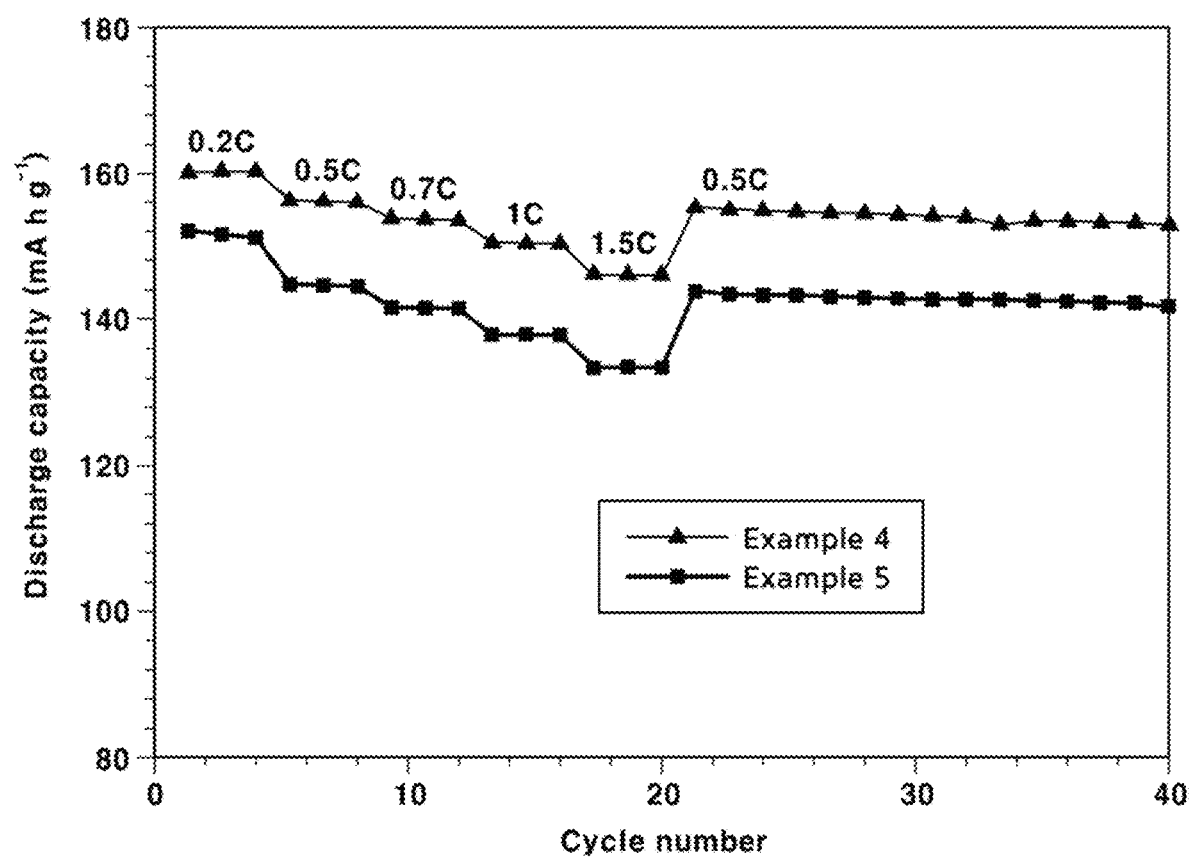

When the all-solid-state batteries manufactured using the binder solutions of Examples 4 and 5 were charged and discharged at about 70° C., the charge-discharge capacity and rate characteristics thereof were measured. The results thereof are shown in FIGS. 7A and 7B. With reference thereto, both the all-solid-state batteries of Examples 4 and 5 exhibited stable performance at a high temperature. Moreover, compared to the evaluation results at room temperature, the discharge capacity and rate characteristics were improved. In particular, the extent of improvement thereof was greater in Example 5 including the lithium salt.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

The invention claimed is:

1. A binder solution for an all-solid-state battery, comprising:
    a first binder having a lithium ion conductivity;
    a second binder having a lithium ion conductivity higher than the lithium ion conductivity of the first binder;
    a lithium salt; and
    an organic solvent that dissolves the lithium salt,
    wherein the first binder comprises nitrile-butadiene rubber (NBR),
    wherein the second binder is selected from the group consisting of poly(propylene carbonate) (PPC), poly (vinyl acetate) (PVA), poly(1,4-butylene adipate) (PBA) and combinations thereof,
    wherein the lithium ion conductivity ($\sigma_1$) of the first binder is $10^{-6}$ S/cm to $10^{-7}$ S/cm,
    wherein the lithium ion conductivity ($\sigma_2$) of the second binder is $4 \times 10^{-4}$ S/cm to $10^{-5}$ S/cm,
    wherein a weight ratio ($m_2/m_1$) of the second binder and the first binder is 3 or less but greater than 0,
    wherein the lithium salt is selected from the group consisting of lithium hexafluorophosphate ($LiPF_6$), lithium bis(fluorosulfonyl)imide (LiFSI), lithium bis(trifluoromethanesulfonyl)imide (LiTFSI), lithium bis(pentafluoroethanesulfonyl)imide (LiBETI), and combinations thereof,
    wherein the second binder is miscible with the first binder, the lithium salt, and the organic solvent,
    wherein the binder solution comprises:
    10 wt % or less but exceeding 0 wt % of the first binder and the second binder;
    0.5 wt % to 3 wt % of the lithium salt; and
    a remainder of the organic solvent,
    wherein the organic solvent is the remainder of the binder solution, whereby the wt % of the first binder and second binder, wt % of the lithium salt, and wt % of the organic solvent sum to 100 wt %.

2. The binder solution of claim 1, wherein the second binder is at least partially miscible with the first binder.

3. The binder solution of claim 1, wherein a lithium ion conductivity ratio ($\sigma_2/\sigma_1$) of the second binder and the first binder is 100 to 4,000.

4. The binder solution of claim 1, wherein the organic solvent is selected from the group consisting of benzyl acetate, ethyl 4-methylbenzoate, anisole, ethyl p-anisate, benzyl isobutyrate and combinations thereof.

5. The binder solution of claim 1, wherein the organic solvent has a boiling point of 150° C. to 300° C.

6. The binder solution of claim 1, wherein the organic solvent has a vapor pressure of 0.001 mmHg to 10 mmHg at room temperature.

7. An electrode slurry for an all-solid-state battery, comprising:
    the binder solution of claim 1;
    an electrode active material;
    a conductive material; and
    a solid electrolyte.

8. The electrode slurry of claim 7, comprising:
    30 wt % or less but exceeding 0 wt % of the binder solution;
    10 wt % or less but exceeding 0 wt % of the conductive material;
    20 wt % or less but exceeding 0 wt % of the solid electrolyte; and
    a remainder of the electrode active material, wherein the electrode active material is the remainder of the electrode slurry, whereby the wt % of the binder solution, wt % of the conductive material, wt % of the solid electrolyte, and wt % of the electrode active material sum to 100 wt %.

\* \* \* \* \*